US011673211B2

(12) United States Patent
Wu et al.

(10) Patent No.: US 11,673,211 B2
(45) Date of Patent: Jun. 13, 2023

(54) TEMPERATURE CONTROL SYSTEM FOR ADDITIVE MANUFACTURING AND METHOD FOR SAME (71) Applicant: GENERAL ELECTRIC COMPANY, Schenectady, NY (US)

(72) Inventors: Yong Wu, Shanghai (CN); Yingna Wu, Shanghai (CN); Zirong Zhai, Shanghai (CN); Hai Chang, Shanghai (CN); Yifeng Wang, Shanghai (CN); Yimin Zhan, Shanghai (CN); Dalong Zhong, Shanghai (CN)

(73) Assignee: General Electric Company, Schenectady, NY (US)

( * ) Notice: Subject to any disclaimer, the term of this patent is extended or adjusted under 35 U.S.C. 154(b) by 890 days.

(21) Appl. No.: 16/243,117

(22) Filed: Jan. 9, 2019

(65) Prior Publication Data
US 2019/0217417 A1    Jul. 18, 2019

(30) Foreign Application Priority Data

Jan. 12, 2018  (CN) .......................... 201810030753.5

(51) Int. Cl.
*B23K 26/342*     (2014.01)
*B33Y 10/00*      (2015.01)
(Continued)

(52) U.S. Cl.
CPC ............ *B23K 26/342* (2015.10); *B21C 51/00* (2013.01); *B21J 1/06* (2013.01); *B21J 5/02* (2013.01);
(Continued)

(58) Field of Classification Search
CPC ....... B21J 5/02; B21J 7/22; B21J 1/06; B23K 26/0093; B23K 26/034; B23K 26/0626;
(Continued)

(56) References Cited

U.S. PATENT DOCUMENTS 4,051,590 A   10/1977  Halter et al.
4,181,050 A    1/1980  Stoobants et al.
(Continued)

FOREIGN PATENT DOCUMENTS

CN    101817121 A    9/2010
CN    102003938 B    7/2013
(Continued)

OTHER PUBLICATIONS

Trosch et al., "Microstructure and mechanical properties of selective laser melted Inconel 718 compared to forging and casting", Materials Letters, vol. 164, pp. 428-431, Feb. 1, 2016.
(Continued)

*Primary Examiner* — Justin C Dodson
*Assistant Examiner* — Dilnessa B Belay
(74) *Attorney, Agent, or Firm* — Dority & Manning, P.A.

(57) ABSTRACT

The invention relates to a temperature control system for additive manufacturing and method for same. The temperature control system comprises: a cladding device configured to fuse a material and form a cladding layer, the cladding device comprising a first energy source; a micro-forging device coupled to the cladding device for forging the cladding layer; a detecting device; a control module; and an adjusting module coupled to at least one of the first energy source and the micro-forging device.

13 Claims, 8 Drawing Sheets (51) Int. Cl.
  *B33Y 30/00* (2015.01)
  *B33Y 50/02* (2015.01)
  *B22F 10/25* (2021.01)
  *B22F 12/90* (2021.01)
  *B22F 10/36* (2021.01)
  *B22F 10/50* (2021.01)
  *B33Y 40/00* (2020.01)
  *B21C 51/00* (2006.01)
  *B21J 1/06* (2006.01)
  *B21J 5/02* (2006.01)
  *B21J 7/22* (2006.01)
  *B23K 26/00* (2014.01)
  *B23K 26/03* (2006.01)
  *B23K 26/06* (2014.01)
  *B22F 3/17* (2006.01)
  *B22F 12/10* (2021.01)
  *B22F 12/45* (2021.01)
  *B22F 10/364* (2021.01)

(52) U.S. Cl.
  CPC ............... *B21J 7/22* (2013.01); *B22F 10/25* (2021.01); *B22F 10/36* (2021.01); *B22F 10/50* (2021.01); *B22F 12/90* (2021.01); *B23K 26/0093* (2013.01); *B23K 26/034* (2013.01); *B23K 26/0626* (2013.01); *B33Y 10/00* (2014.12); *B33Y 30/00* (2014.12); *B33Y 40/00* (2014.12); *B33Y 50/02* (2014.12); *B22F 10/364* (2021.01); *B22F 12/10* (2021.01); *B22F 12/45* (2021.01); *B22F 2003/175* (2013.01); *B22F 2999/00* (2013.01)

(58) Field of Classification Search
  CPC ...... B23K 26/342; B33Y 10/00; B33Y 30/00; B33Y 40/00; B33Y 50/02; B21C 51/00
  See application file for complete search history.

(56) References Cited

U.S. PATENT DOCUMENTS

| | | |
|---|---|---|
| 8,887,545 B2 | 11/2014 | Ito et al. |
| 9,302,338 B2 | 4/2016 | Zhang et al. |
| 2005/0086783 A1 | 4/2005 | Beignon et al. |
| 2017/0173878 A1* | 6/2017 | Myerberg ............... B22F 12/13 |
| 2017/0252860 A1* | 9/2017 | Bamberg ........... B23K 15/0086 |
| 2019/0047050 A1 | 2/2019 | Zhang et al. |

FOREIGN PATENT DOCUMENTS

| | | |
|---|---|---|
| CN | 203382819 U | 1/2014 |
| CN | 104493424 B | 8/2016 |
| CN | 106041073 A | 10/2016 |
| CN | 106112254 A | 11/2016 |
| CN | 106670623 A | 5/2017 |
| CN | 106825348 A | 6/2017 |
| CN | 106825574 A * | 6/2017 |
| CN | 106825574 A | 6/2017 |
| CN | 106843321 A | 6/2017 |
| CN | 206348681 U | 7/2017 |
| CN | 107287588 A | 10/2017 |
| CN | 107414325 A | 12/2017 |
| CN | 107470628 A | 12/2017 |
| CN | 107475709 A | 12/2017 |
| EP | 2001628 A1 | 11/2007 |
| EP | 3009898 A1 | 4/2016 |
| WO | WO2016/092253 A1 | 6/2016 |

OTHER PUBLICATIONS

Nestor et al., "In-situ morphology and temperature monitoring of laser based metal additive manufacturing for defect detection", 2017 Conference on Lasers and Electro-Optics Europe & European Quantum Electronics Conference (CLEO/Europe-EQEC), pp. 1-1, Jun. 25-29, 2017.

Extended European Search Report, dated May 29, 2019, for related EP patent application No. EP 19151391.0.

Chinese Search Report Corresponding to Application No. 2017100307535 dated Aug. 27, 2020.

\* cited by examiner

TEMPERATURE CONTROL SYSTEM FOR ADDITIVE MANUFACTURING AND METHOD FOR SAME

TECHNICAL FIELD

The present invention relates to the field of additive manufacturing technology, and in particular to a temperature control system for additive manufacturing and method for same.

BACKGROUND OF THE DISCLOSURE

Additive manufacturing technology is a rapidly evolving emerging technology for material processing. At present, the mainstream additive manufacturing usually achieves metallurgical bonding of metal materials through the "melting-solidification" method, which is characterized by using a high-energy beam such as a laser beam, an electron beam or an arc beam as a heat source to melt the synchronously fed metal material, such as metal powder, metal wire, and so on, which are stacked in layers, whereby parts are manufactured by surfacing, and the internal microstructure of the obtained parts is a solidified structure.

Compared with the conventional forged structure, the solidified structure obtained by the above-mentioned "melting-solidification" method produces crystals that are very coarse with obvious directionality, therefore in a general sense, it is difficult to achieve comprehensive performance comparable to that of a forged material. In order to improve the mechanical properties of the obtained parts and reduce internal defects, a method of combining the molten deposition additive with thermomechanical processing has been gradually developed, that is, material deposition and metallurgical bonding are achieved by melting-solidification, thereafter rolling, shock processing and other treatments are used to refine the grains and improve internal quality.

One of the most important factors influencing the surface quality and mechanical properties of the obtained parts during such melt-bonded forging additive manufacturing process, is the control of the temperature at the forging position. Due to the high complexity of the process and equipment, the gap between the forging device and the forging position may be too small to be effectively controlled by the conventional temperature sensor to monitor the temperature at the forging position in real time, thereby influencing the material's scope of application and forging effect.

Therefore, there is a need for a new temperature control system for additive manufacturing and method for same that addresses at least one of the above problems.

BRIEF DESCRIPTION OF THE DISCLOSURE

It is an object of the present invention to provide a temperature control system for additive manufacturing and method for same.

In one aspect, embodiments of the present invention relate to a temperature control system for additive manufacturing comprising a cladding device, a micro-forging device, a detecting device, a control module, and an adjusting module. A cladding device configured to fuse the material and form a cladding layer, the cladding device comprising a first energy source configured to direct an energy beam toward the material for fusing at least a portion of the material to form the cladding layer. A micro-forging device coupled to the cladding device for forging the cladding layer. A detecting device configured to detect a first internal effect parameter of the cladding layer at a forging position where it is forged by the micro-forging device. A control module configured to receive the first internal effect parameter detected by the detecting device, and calculate a first calculated temperature at the forging position based on the first internal effect parameter. An adjusting module coupled to at least one of the first energy source and the micro-forging device and configured to receive the first calculated temperature and to adjust at least one of the first energy source and the micro-forging device to make the first calculated temperature at the forging position fall within a desired temperature range if the first calculated temperature does not fall within the desired temperature range.

In another aspect, embodiments of the invention relate to a temperature control method for additive manufacturing. The method comprises: directing an energy beam of a first energy source toward a material and fusing at least a portion of the material to form a cladding layer; forging the cladding layer with a micro-forging device; detecting a first internal effect parameter of the cladding layer at a forging position where it is forged by the micro-forging device; calculating a first calculated temperature of the cladding layer at the forging position based on the first internal effect parameter; and adjusting at least one of the first energy source and the micro-forging device if the first calculated temperature does not fall within a desired temperature range.

In yet another aspect, embodiments of the invention relate to a temperature control method for additive manufacturing. The method comprises the following steps:

a) Directing an energy beam of a first energy source toward a material and fusing at least a portion of the material to form a cladding layer;

b) Forging the cladding layer with a micro-forging device;

c) Detecting an amplitude of the micro-forging device that is forging the cladding layer and determining a strain at the forging position based on the amplitude;

d) Calculating a first calculated temperature at the forging position based on the strain and a strain versus temperature curve;

e) Determining whether the first calculated temperature at the forging position falls within a desired temperature range, if yes, executing steps g) to i), if not, executing steps f) to i);

f) Adjusting at least one of the first energy source and the micro-forging device to make the first calculated temperature at the forging position fall within the desired temperature range;

g) Detecting an axial load of a main axis of the cladding device applied by the micro-forging device and determining a stress at the forging position based on the axial load;

h) Calculating a second calculated temperature at the forging position based on the stress and a stress versus temperature curve; and i) Determining whether the second calculated temperature at the forging position falls within the desired temperature range, if yes, adjusting end, if not, updating the strain versus temperature versus curve and/or the stress versus temperature curve based on an adaptive algorithm and processing back to step c).

BRIEF DESCRIPTION OF DRAWINGS

To read the following detailed description with reference to the accompanying drawings can help understand the features, aspects and advantages of the present invention, where.

DETAILED DESCRIPTION OF EMBODIMENTS

"Comprise", "include", "have", and similar terms used in the present application are meant to encompass the items listed thereafter and equivalents thereof as well as other additional items. Approximating language in the present application is used to modify a quantity, indicating that the present invention is not limited to the specific quantity, and may include modified parts that are close to the quantity, acceptable, and do not lead to change of related basic functions.

In the specifications and claims, unless otherwise clearly indicated, no limitation is imposed on singularity and plurality of all items. Unless otherwise clearly indicated, the terms "OR", "or" do not mean exclusiveness, but mean at least one of the mentioned item (such as ingredients), and include a situation where a combination of the mentioned exists.

"Some embodiments" and the like mentioned in the present application specification represent that specific elements (such as a characteristic, structure, and/or feature) related to the present invention are included in at least one embodiment described in the specification, and may or may not appear in another embodiment. In addition, it should be understood that the invention elements can be combined in any manner.

Embodiments of the present invention relate to a temperature control system for additive manufacturing, comprising a cladding device, a micro-forging device, a detecting device, a control module, and an adjusting module. Wherein the cladding device is configured to fuse the material and form a cladding layer, the cladding device comprising a first energy source configured to direct an energy beam toward the material for fusing at least a portion of the material to form the cladding layer. The micro-forging device is coupled to the cladding device for forging the cladding layer. The detecting device is configured to detect a first internal effect parameter of the cladding layer at a forging position where it is forged by the micro-forging device. The control module is configured to receive the first internal effect parameter detected by the detecting device, and calculate a first calculated temperature at the forging position based on the first internal effect parameter. The adjusting module coupled to at least one of the first energy source and the micro-forging device and configured to receive the first calculated temperature and to adjust at least one of the first energy source and the micro-forging device to make the first calculated temperature at the forging position fall within a desired temperature range if the first calculated temperature does not fall within the desired temperature range.

Figure 1:
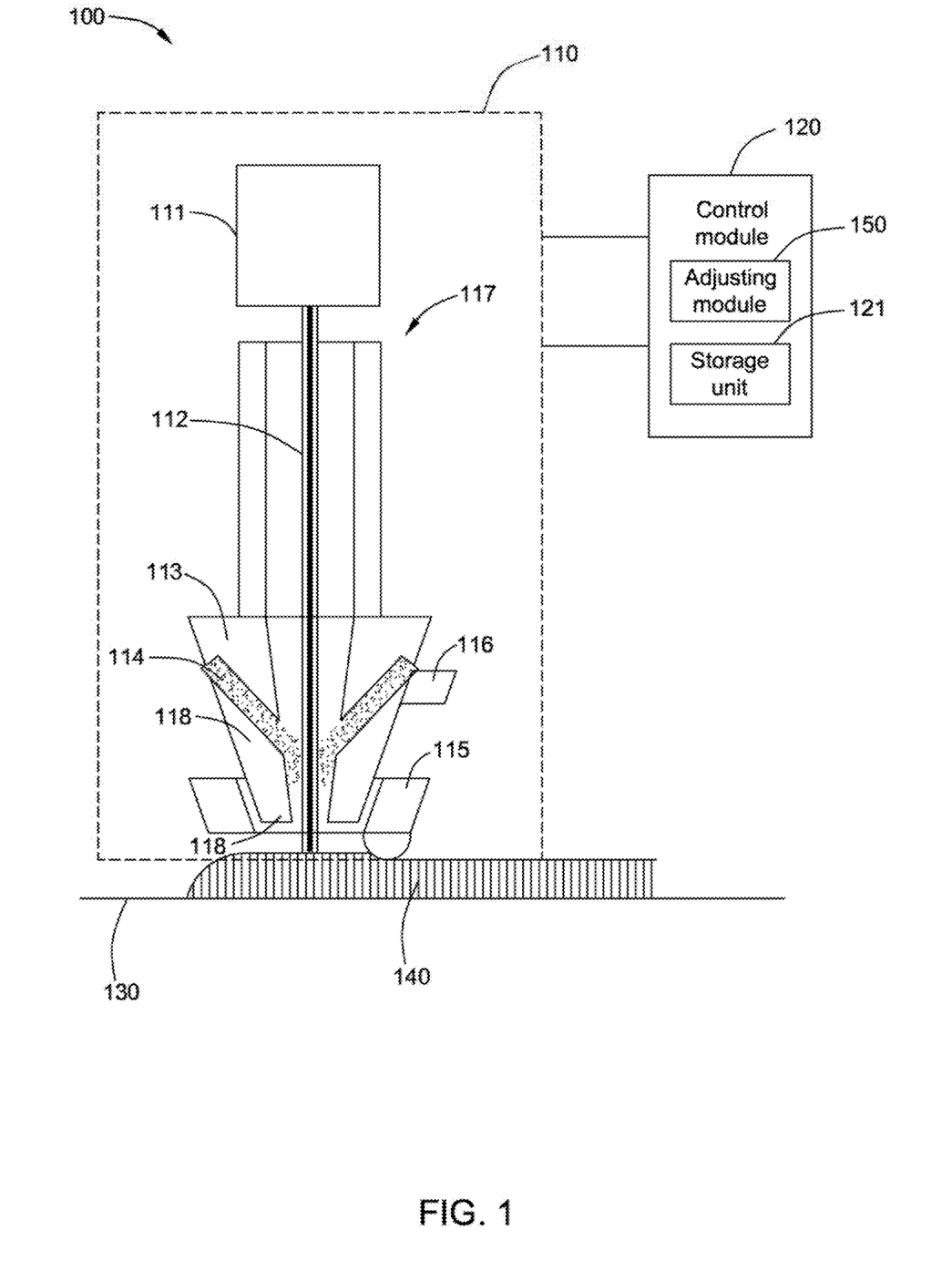
FIG. 1 is a schematic illustration of a temperature control system for additive manufacturing according to one embodiment of the present invention.

FIG. 1 shows a schematic diagram of a temperature control system 100 for additive manufacturing according to one embodiment of the present invention. As shown in FIG. 1, the temperature control system 100 comprises an additive manufacturing device 110 and a control module 120. Whereas, the additive manufacturing apparatus 110 comprises a cladding device 117, a micro-forging device 115, and a detecting device 116. The cladding device 117 is configured to fuse the material and form a cladding layer 140 on the platform 130, specifically comprising a first energy source 111 and a material conveyor 113. A material conveyor 113 is configured to feed material 114 to the platform 130 or the cladding layer 140. The first energy source 111 is configured to provide an energy beam 112; when the material 114 is sent to the platform 130 or the cladding layer 140, the first energy beam 112 is directed toward and fusing the material 114, and the molten material rapidly solidifies to form a portion of the cladding layer 140 and becomes part of the object being formed. The micro-forging device 115 is coupled to the cladding device 117 and moves in synchronization with the cladding device 117 to forge the formed cladding layer 140 online and in real time, after the material conveyor 113 of the cladding device 117. The detecting device 116 is configured to detect a first internal effect parameter of the cladding layer 140 at a forging position where it is forged by the micro-forging device 115. The control module 120 comprises a storage unit 121 stored therein a first internal-effect-parameter versus temperature curve of the material 114, the control module 120 receives the first internal effect parameter detected by the detection module 116, calculating the first calculated temperature at the forging position based on the first internal effect parameter and the first internal-effect-parameter versus temperature curve. In some embodiments, the first internal-effect-parameter versus temperature curve is an empirical model curve fitted based on existing experimental data. The control module 120 further comprises an adjusting module 150 coupled to at least one of the first energy source 111 and the micro-forging device 115, receiving the first calculated temperature calculated by the control module 120; if the first calculated temperature at the forging position does not fall within the desired temperature range, the first calculated temperature at the forging position is made to fall within a desired temperature range required for material forging by adjusting at least one of the first energy source 111 and the micro-forging device 115, with the desired temperature range, the nature of the material 114 itself, and the distance between the forging position and the molten pool in which the material 114 is melted being related. In other embodiments, the adjusting module 150 may be independent from the control module 120, e.g., mounted to the cladding device 117.

The first energy source 111 can be any device or device capable of providing an energy beam suitable for additive manufacturing. Specific embodiments of the energy beam include, but are not limited to, a laser beam, an electron beam, a plasma beam, and an arc beam. The material 114 is typically delivered in the form of a powder or wire (e.g., metal powder, wire, etc.). The material conveyor 113 may comprise a powder feeding nozzle for conveying the powder material, or a wire feeding device for conveying the wire. In some embodiments, the material conveyor 113 comprises a powder feeding nozzle or wire feeding device that is coaxial with the energy beam. For example, in the embodiment illustrated in FIG. 1, the material conveyed by material conveyor 113 is in powder form, and comprises a powder feeding nozzle 118 that is coaxial with the energy beam 112. In other embodiments, the material conveyed by the material conveyor 113 may be in the form of a wire, and the material conveyor 113 may comprise a wire feeding device that is coaxial with the energy beam 112.

In some embodiments, the detecting device 116 is further configured to detect a second internal effect parameter of the cladding layer 140 at the forging position forged by the micro-forging device 115, and the storage unit 121 further stores a second internal-effect-parameter versus temperature curve of the material 114. Wherein, if the first calculated temperature at the forging position falls within the desired temperature range, the control module 150 calculates the second calculated temperature at the forging position based on the second internal effect parameter and the second internal-effect-parameter versus temperature curve stored by the storage unit 121. If the second calculated temperature does not within the desired temperature range, there may be an error in at least one of the first internal-effect-parameter versus temperature curve and the second internal-effect-parameter versus temperature curve that needs to be corrected; in an unconstrained embodiment, the first internal-effect-parameter versus temperature curve and/or the second internal-effect-parameter versus temperature curve may be updated based on an adaptive algorithm. After the update, the adjusting module 150 performs an adjustment such that the adjusted first calculated temperature and the second calculated temperature fall within the desired temperature range. In some embodiments, the adaptive algorithm is an adaptive proportional-integral-derivative (PID) algorithm.

In some embodiments, the internal effect parameter may be the force of the cladding layer under the action of the micro-forging device or the effect produced by the force, including but not limited to stress and strain. As shown in FIG. 1, the micro-forging device 115 is mounted on the material conveyor 113 of the cladding device 117; the detecting device 116 is mounted above the material conveyor 113, for detecting at least one of the stress and the strain of the cladding layer 140 at the forging position forged by the micro-forging device 115. In some embodiments, the mounting location of the detecting device 116 is not limited thereto, e.g., it may be coupled to other locations of the cladding device 117 or integrated into the control module 120. The detecting device integrated into the control module 120 can detect or collect an axial load of a main axis of the cladding device 117 applied by the micro-forging device, and determine a stress of the cladding layer 140 at the forging position based on the axial load, and transmit it to the control module 120.

Figure 2:
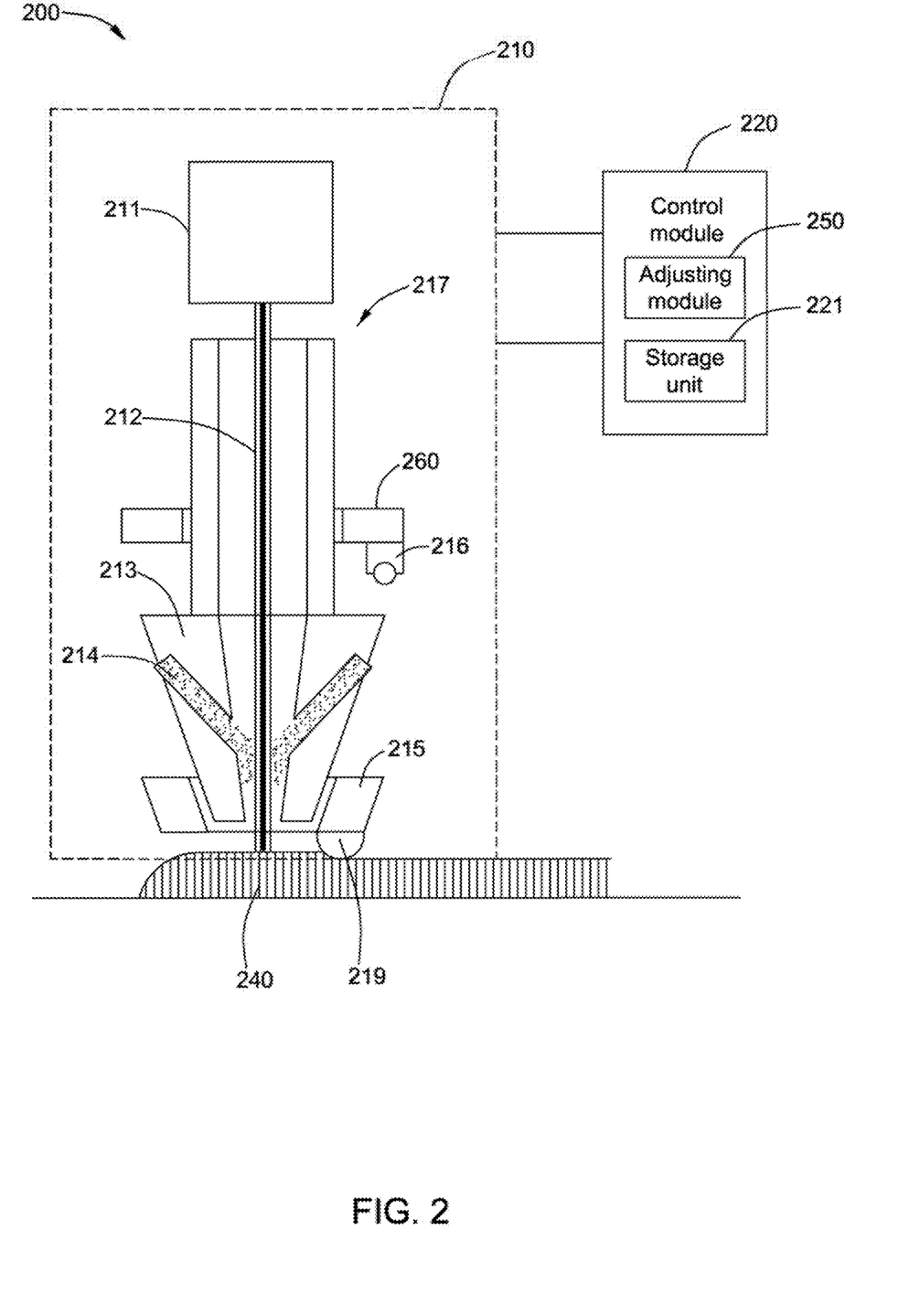
FIG. 2 is a schematic view of a temperature control system for additive manufacturing according to another embodiment of the present invention.

FIG. 2 shows a schematic diagram of a temperature control system 200 for additive manufacturing according to another embodiment of the present invention. As shown in FIG. 2, the temperature control system 200 comprises an additive manufacturing device 210 and a control module 220. Whereas, the additive manufacturing device 210 comprises a cladding device 217, a micro-forging device 215, and a detecting device 216. The cladding device 217 comprises a first energy source 211 and a material conveyor 213 for providing an energy beam 212. The micro-forging device 215 is mounted to a material conveyor 213 of the cladding device 217; the micro-forging device 215 comprises a forging hammer 219 configured to forge the cladding layer 240 through vibration. The detecting device 216 is a distance sensor configured to detect an amplitude of the micro-forging device 215 that is forging the cladding layer 240, and determine a strain of the cladding layer 240 at the forging position based on the amplitude. The control module 220 comprises an adjusting module 250 and a storage unit 221, the storage unit 221 stored therein a strain versus temperature curve of the material 214, and the control module 220 is configured to calculate the first calculated temperature at the forging position based on the strain and the strain versus temperature curve. In some embodiments, the detecting device 216 is a stress detecting module for detecting an axial load of a main axis of the cladding device 217 applied by the micro-forging device, and determine a stress of the cladding layer 240 at the forging position based on the axial load. While the storage unit 221 stores the stress versus temperature curve of the material 214, and the control module 220 calculates the first calculated temperature at the forging position based on the stress and the stress versus temperature curve at the forging position. The adjusting module 250 is coupled to at least one of the first energy source 211 and the micro-forging device 215, receiving the first calculated temperature calculated by the control module 220; if the first calculated temperature at the forging position does not fall within the desired temperature range, the first calculated temperature at the forging position is made to fall within a desired temperature range required for material forging by adjusting at least one of the first energy source 211 and the micro-forging device 215, with the desired temperature range, the nature of the material 214 itself, and the distance between the forging position and the molten pool in which the material 214 is melted being related. In other embodiments, the adjusting module 250 may be independent from the control module 220, e.g., mounted to the cladding device 217.

To facilitate installation and measurement of the detecting device 216, in the embodiment shown in FIG. 2, the cladding device 217 and the detecting device 216 are connected by a certain connecting mechanism 260. The arrangement of the connecting mechanism 260 enables the relative motion and synergy between the cladding device 217 and the detecting device 216. The connecting mechanism 260 comprises, but is not limited to, a linkage, a bracket, a slide, and so on.

Figure 3:
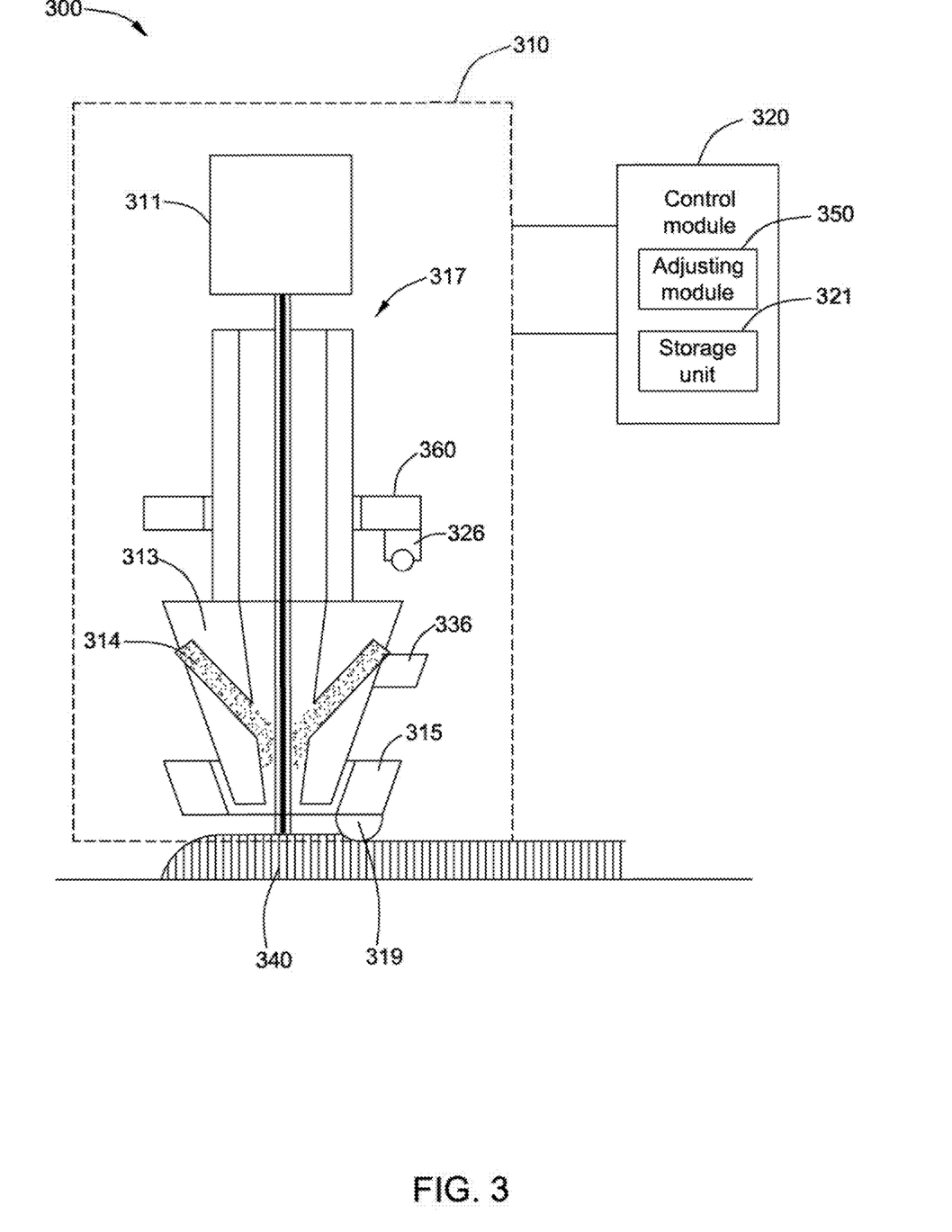
FIG. 3 is a schematic diagram of a temperature control system for additive manufacturing according to yet another embodiment of the present invention.

FIG. 3 shows a schematic diagram of a temperature control system 300 for additive manufacturing according to yet another embodiment of the present invention. As shown in FIG. 3, the temperature control system 300 comprises an additive manufacturing device 310 and a control module 320. Whereas, the additive manufacturing device 310 comprises a cladding device 317, a micro-forging device 315, a distance sensor 326, and a stress detecting module 336. The cladding device 317 comprises a first energy source 311 and a material conveyor 313. The micro-forging device 315 is mounted to a material conveyor 313 of the cladding device 317, the micro-forging device 315 comprises a forging hammer 319 configured to forge the cladding layer 340 through vibration. The distance sensor 326 is configured to detect an amplitude of the micro-forging device 315 that is forging the cladding layer 340, and determine a strain at the forging position based on the amplitude. The control module 320 comprises an adjusting module 350 and a storage unit 321, the storage unit 321 stored therein a strain versus temperature curve of the material 314, and the control module 320 is configured to calculate the first calculated temperature at the forging position based on the strain and the strain versus temperature curve. The adjusting module 350 is coupled to at least one of the first energy source 311 and the micro-forging device 315, receiving the first calculated temperature calculated by the control module 320; if the first calculated temperature at the forging position does not fall within the desired temperature range, the first calculated temperature at the forging position is made to fall within a desired temperature range required for material forging by adjusting at least one of the first energy source 311 and the micro-forging device 315. After an adjustment, the stress detecting module 336 is configured to detect an axial load of a main axis of the cladding device 317 applied by the micro-forging device 315, and determine an adjusted stress at the forging position based on the load. The storage unit 321 stores the stress versus temperature curve of the material 314, and the control module 320 calculates a second calculated temperature at the forging position based on the adjusted stress and stress versus temperature curve at the forging position. When the second calculated temperature falls within the desired temperature range, it indicates that the adjusted first calculated temperature meets the forging requirement, and the adjustment ends. When the second calculated temperature does not fall within the desired temperature range, in an unconstrained embodiment, the strain versus temperature curve and/or the stress versus temperature curve may be updated based on an adaptive algorithm. After the update, the adjusting module 350 performs an adjustment such that the adjusted first calculated temperature and the second calculated temperature fall within the desired temperature range. In the above embodiment, the strain parameter detected by the distance sensor 326 is used to adjust the first calculated temperature, and the stress parameter detected by the stress detecting module 336 is used to correct the adjusted first calculated temperature. In other embodiments, the stress parameter detected by the stress detection module 336 is used to adjust the first calculated temperature, and the strain parameter detected by the distance sensor 326 is used to correct the adjusted first calculated temperature.

Figure 4:
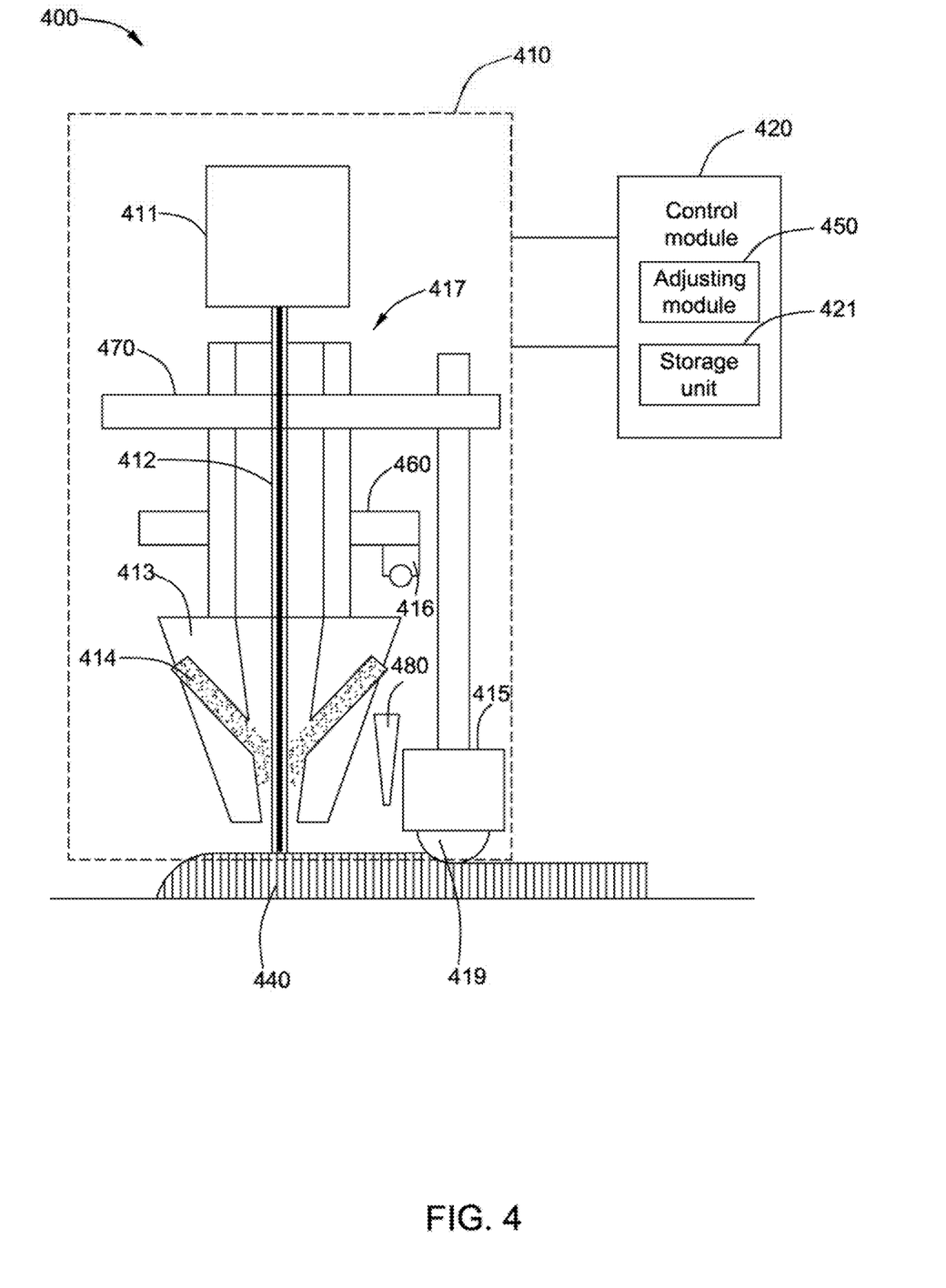
FIG. 4 is a schematic diagram of a temperature control system for additive manufacturing according to still another embodiment of the present invention.

FIG. 4 shows a schematic diagram of a temperature control system 400 for additive manufacturing according to yet another embodiment of the present invention. As shown in FIG. 4, the temperature control system 400 comprises an additive manufacturing device 410 and a control module 420. The additive manufacturing device 410 comprises a cladding device 417, a micro-forging device 415, and a detecting device 416; the control module 420 comprises an adjusting module 450 and a storage unit 421. The cladding device 417 comprises a first energy source 411 and a material conveyor 413 for providing an energy beam 412. The cladding device 417 and the micro-forging device 415 are connected by a certain connecting mechanism 470. The arrangement of the connecting mechanism 470 enables relative motion and synergy between the cladding device 417 and the micro-forging device 415. The connecting mechanism 470 comprises, but is not limited to, a linkage, a bracket, a slide, and so on. The micro-forging device 415 comprises a forging hammer 419 configured to forge the cladding layer 440 through vibration.

The additive manufacturing device 410 is widely applicable to various materials for additive manufacturing, and is particularly suitable for high-temperature alloy materials such as nickel-based and cobalt-based alloys, whose mechanical properties are not substantially degraded in a use environment below 650° C.

In some embodiments, the cladding device 417 and the detecting device 416 are connected by a certain connecting mechanism 460. The arrangement of the connecting mechanism 460 enables the relative motion and synergy between the cladding device 417 and the detecting device 416. The connecting mechanism 460 comprises, but is not limited to, a linkage, a bracket, a slide, and so on.

In some embodiments, the temperature control system 400 further comprises a second energy source 480, wherein the energy beam is directed toward the forging position of the cladding layer 440 in order to increase the temperature of the forging position. The second energy source is selected from one or more of a laser energy source, an electron beam energy source, a plasma energy source, an infrared energy source, an electromagnetic induction energy source, and a resistance energy source. The second energy source 480 may be mounted at any location as would be apparent to those of ordinary skill in the art including, but not limited to, between the cladding device 417 and the micro-forging device 415, and on top of the micro-forging device 415 away from the cladding device 417.

In some embodiments, the adjusting module 450 further enables the adjustment of the first energy source 411, the micro-forging device 415, the second energy source 480, and other devices in the system, including but not limited to: adjustment of the relative position of the micro-forging device 415, adjustment of the energy output of the first energy source 411 and/or the second energy source 480.

Figure 5:
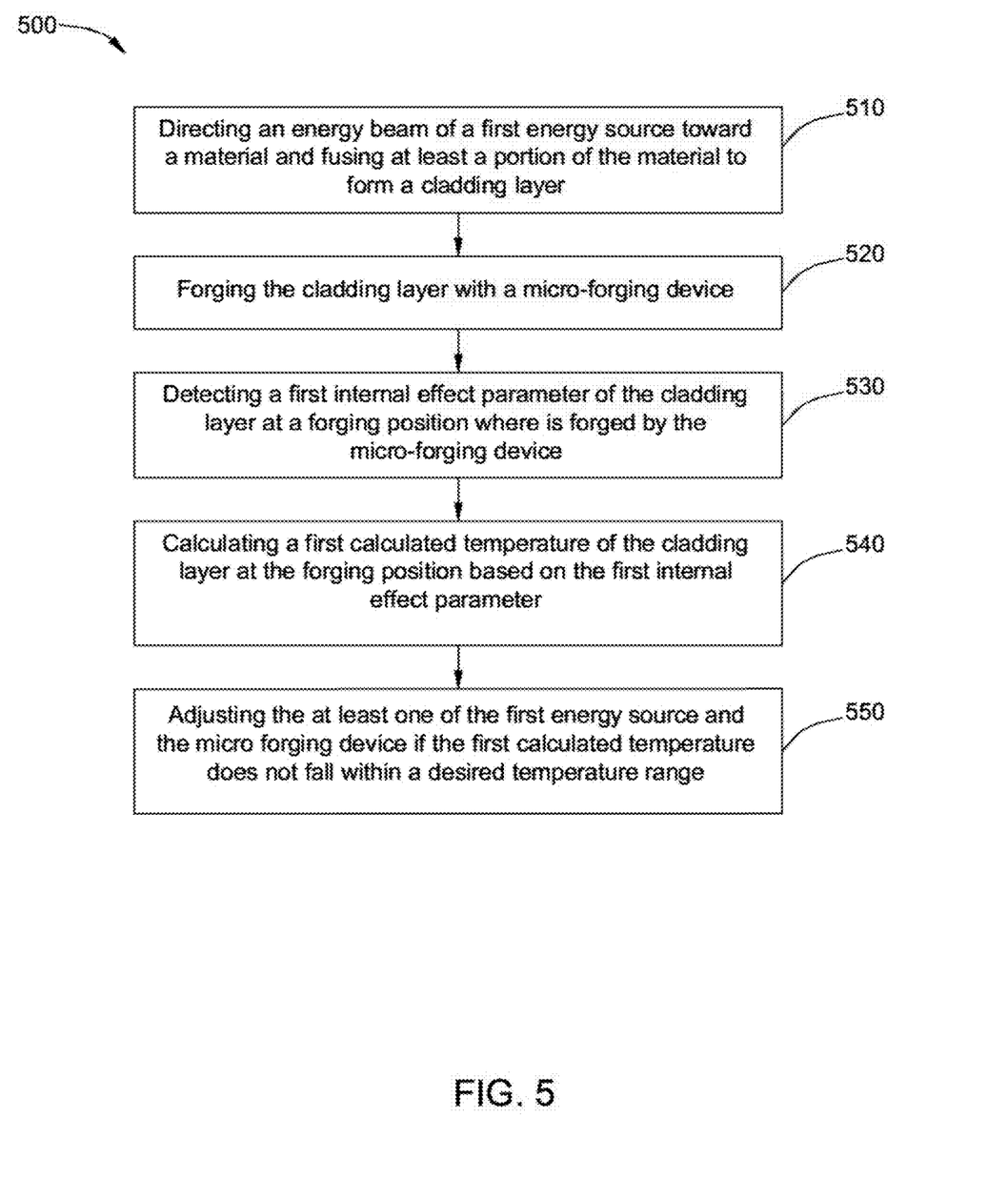
FIG. 5 is a schematic flow chart of a temperature control method for additive manufacturing according to an embodiment of the present invention.

FIG. 5 is a flow chart of a temperature control method 500 for additive manufacturing according to an embodiment of the present invention. The method 500 comprises the following steps:

Step 510: Directing an energy beam of a first energy source toward a material and fusing at least a portion of the material to form a cladding layer.

In step 520: Forging the cladding layer with a micro-forging device.

Step 530: Detecting a first internal effect parameter of the cladding layer at a forging position where it is forged by the micro-forging device.

Step 540: Calculating a first calculated temperature of the cladding layer at the forging position based on the first internal effect parameter.

Step 550: Adjusting at least one of the first energy source and the micro-forging device if the first calculated temperature does not fall within a desired temperature range.

The desired temperature range is related to the nature of the material itself and the distance between the forging position and the molten pool where the material is melted.

Figure 6:
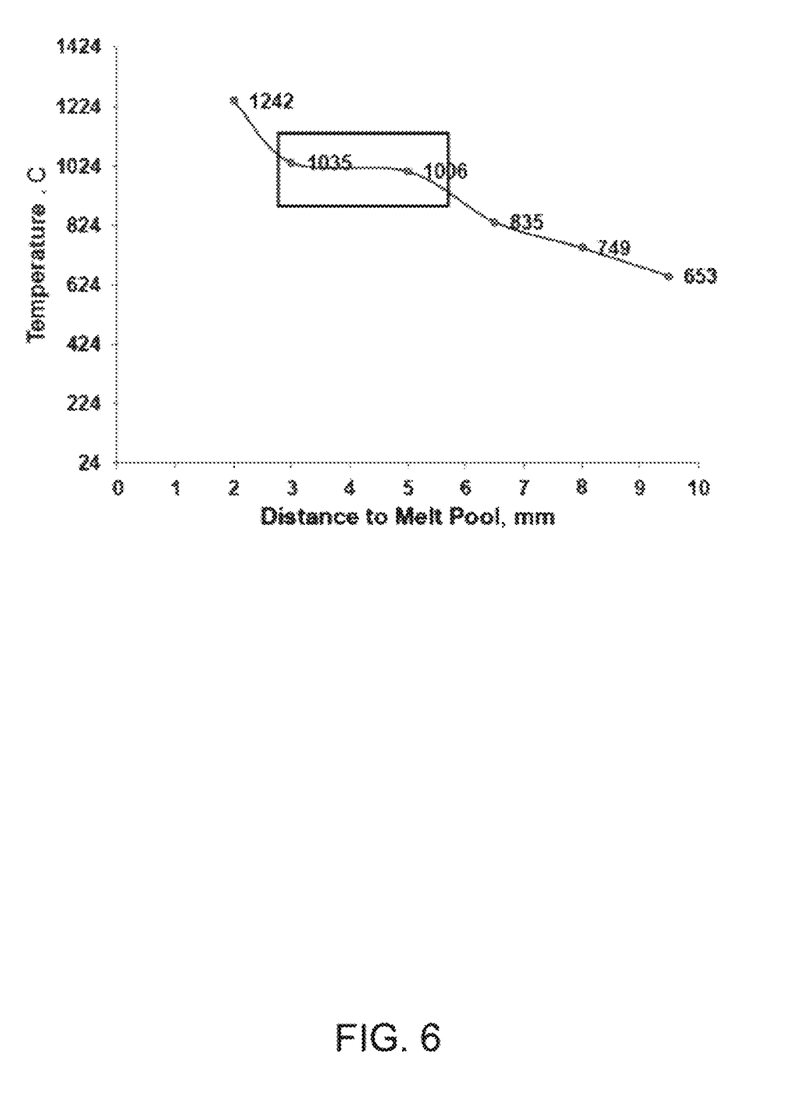
FIG. 6 is a graph showing the relationship between the surface temperature of a material and its distance from the center of the molten pool in one embodiment of the present invention.

FIG. 6 is a graph showing the relationship between the surface temperature of a material and its distance from the molten pool in one embodiment of the present invention. In some embodiments, an Inconel 718 alloy is selected for additive manufacturing, and the Inconel 718 alloy is a precipitation hardened nickel-chromium-iron alloy containing bismuth and molybdenum. For Inconel 718 alloys, the desired temperature range for forging is 980° C. to 1,100° C. The Inconel 718 alloy is forged within this temperature range, and the obtained product has a good surface morphology and stable internal mechanical properties. Moreover, as shown in FIG. 6, within the temperature range of 980° C. to 1,100° C. (inside the rectangle), the surface temperature of the Inconel 718 alloy material does not change much as its distance from the molten pool changes.

The advantage of this is that, on the one hand, even if its distance of the hammer head of the micro-forging device from the molten pool is changed due to the up and down vibration, the forging effect is not affected by too great a change in temperature, thereby improving forging stability. On the other hand, the measured internal effect parameters will not become unstable due to the temperature changing too fast with the distance from the molten pool, thereby making it impossible to accurately calculate the temperature at the forging position, and improving the accuracy of temperature control.

More specifically, Step 540 may comprise the following sub-steps:

Step 541: Storing a first internal-effect-parameter versus temperature curve of the material.

Step 542: Calculating a first calculated temperature at the forging position based on the first internal effect parameter and the first internal-effect-parameter versus temperature curve.

Figure 7:
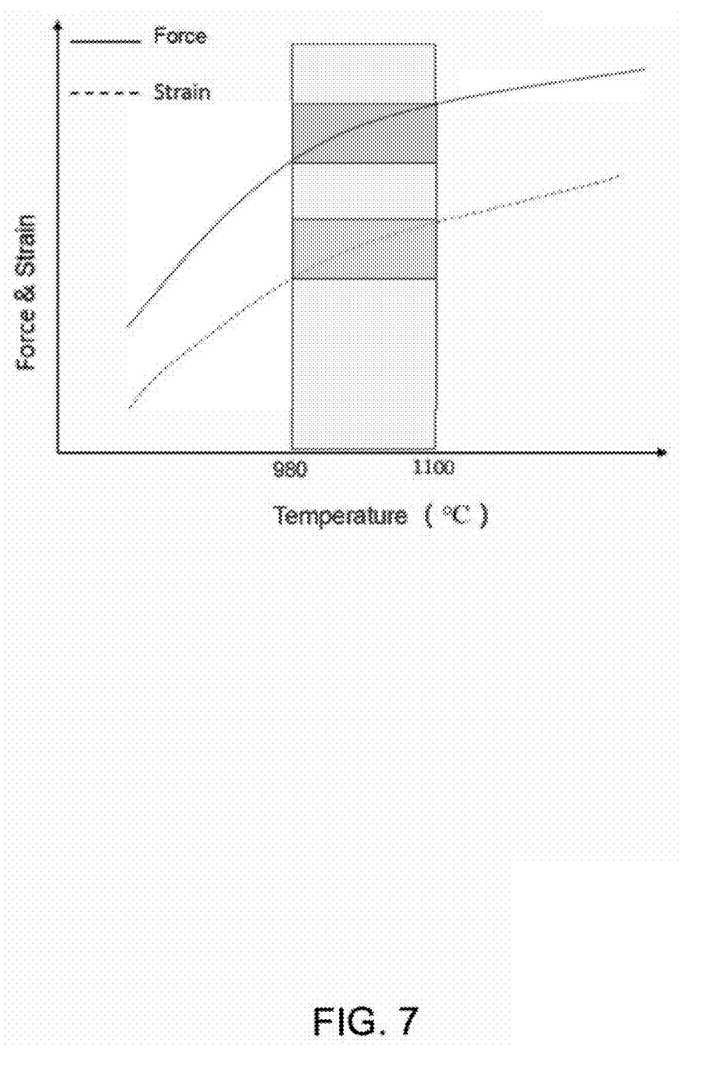
FIG. 7 shows the internal effect parameter and temperature relationship model for the material shown in FIG. 6, where the thick solid line represents the stress versus temperature curve and the dotted line represents the strain versus temperature curve.

In some embodiments, the first internal effect parameter is strain. Referring to FIG. 6 and FIG. 7, FIG. 7 shows an internal effect parameter and temperature relationship model suitable for the material shown in FIG. 6, wherein the dotted line represents the strain versus temperature curve. The detection module determines the strain at the forging position by detecting the amplitude of the micro-forging device acting on the cladding layer. The control module receives the strain parameter, and calculates a first calculated temperature at the forging position using the strain and the strain versus temperature curve shown in FIG. 7. When the first calculated temperature falls within the desired temperature range for forging (980° C. to 1,100° C.), the additive manufacturing reaction continues. When the first calculated temperature at the forging position does not fall within a desired temperature range, the first calculated temperature at the forging position is made to fall within a desired temperature range by adjusting at least one of the first energy source and the micro-forging device.

In some embodiments, referring to FIG. 4, when the first calculated temperature at the forging position is less than the minimum value of the desired temperature range, the adjusting module 450 increases the output energy/power of the first energy source 411 and/or the second energy source 480, such that the adjusted first calculated temperature falls within the desired temperature range for forging. The ratio of energy adjustment is determined by the first calculated temperature, the desired temperature range for forging, and the energy-source-output-temperature versus output-power model.

In some embodiments, referring to FIG. 4, the micro-forging device 415 may be moved relative to the cladding device 417 through a coupling mechanism 470, for adjusting the distance between the micro-forging device 415 and the molten pool whereby the material 414 is melted. When the first calculated temperature at the forging position is less than the minimum value of the desired temperature range, the micro-forging device 415 is adjusted to move closer to the molten pool to the adjusted forging position in a direction, such that the first calculated temperature of the adjusted forging position falls within a desired temperature range. In some embodiments, because the complexity of the device gives the adjustable space of the forging position a higher priority, the first calculated temperature at the forging position can therefore be adjusted through adjusting a combination of the micro-forging device and the first or second energy source.

In some embodiments, referring to FIG. 4, when the first calculated temperature at the forging position is greater than the maximum value of the desired temperature range, the adjusting module 450 decreases the output energy/power of the first energy source 411 and/or the second energy source 480, such that the adjusted first calculated temperature falls within the desired temperature range for forging.

In some embodiments, when the first calculated temperature at the forging position is greater than the maximum value of the desired temperature range, the micro-forging device is adjusted to move away from the molten pool to the adjusted forging position, such that the first calculated temperature of the adjusted forging position falls within the desired temperature range.

In other embodiments, the first internal effect parameter is stress. The specific steps are similar to the temperature control method for detecting strain, and their description will not be repeated herein.

In some embodiments, to realize correction of the temperature control method described above, the method 500 further comprises the following steps:

Step 560: Detecting a second internal effect parameter of the cladding layer at the forging position being forged by the micro-forging device. In some embodiments, the second internal effect parameter is stress, and the stress at the forging position can be determined by detecting the axial load of the main axis of the cladding device applied by the micro-forging device.

Step 570: Calculating a second calculated temperature of the forging position based on the second internal effect parameter and a second internal-effect-parameter versus temperature curve. In some embodiments, the second internal-effect-parameter versus temperature curve is a stress versus temperature relationship curve shown by the solid line in FIG. 7.

Step 580: Updating the first internal-effect-parameter versus temperature curve and/or the second internal-effect-parameter versus temperature curve based on an adaptive algorithm if the second calculated temperature does not fall within the desired temperature range.

In some embodiments, the control module receives the stress parameter and calculates a second calculated temperature at the forging position using the stress and the stress versus temperature curve shown in FIG. 7. When the second calculated temperature falls within the desired temperature range of forging (980° C. to 1,100° C.), the additive manufacturing reaction continues according to the adjustment of Step 550. When the second calculated temperature at the forging position does not fall within the desired temperature range, there may be an error in at least one of the strain versus temperature curve and the stress versus temperature curve that requires correction, and in an unconstrained embodiment, the strain versus temperature curve and/or stress versus temperature curve may be updated based on the adaptive algorithm. After the update, the adjusting module performs adjustment so that the adjusted first calculated temperature and the second calculated temperature fall within the desired temperature range.

Figure 8:
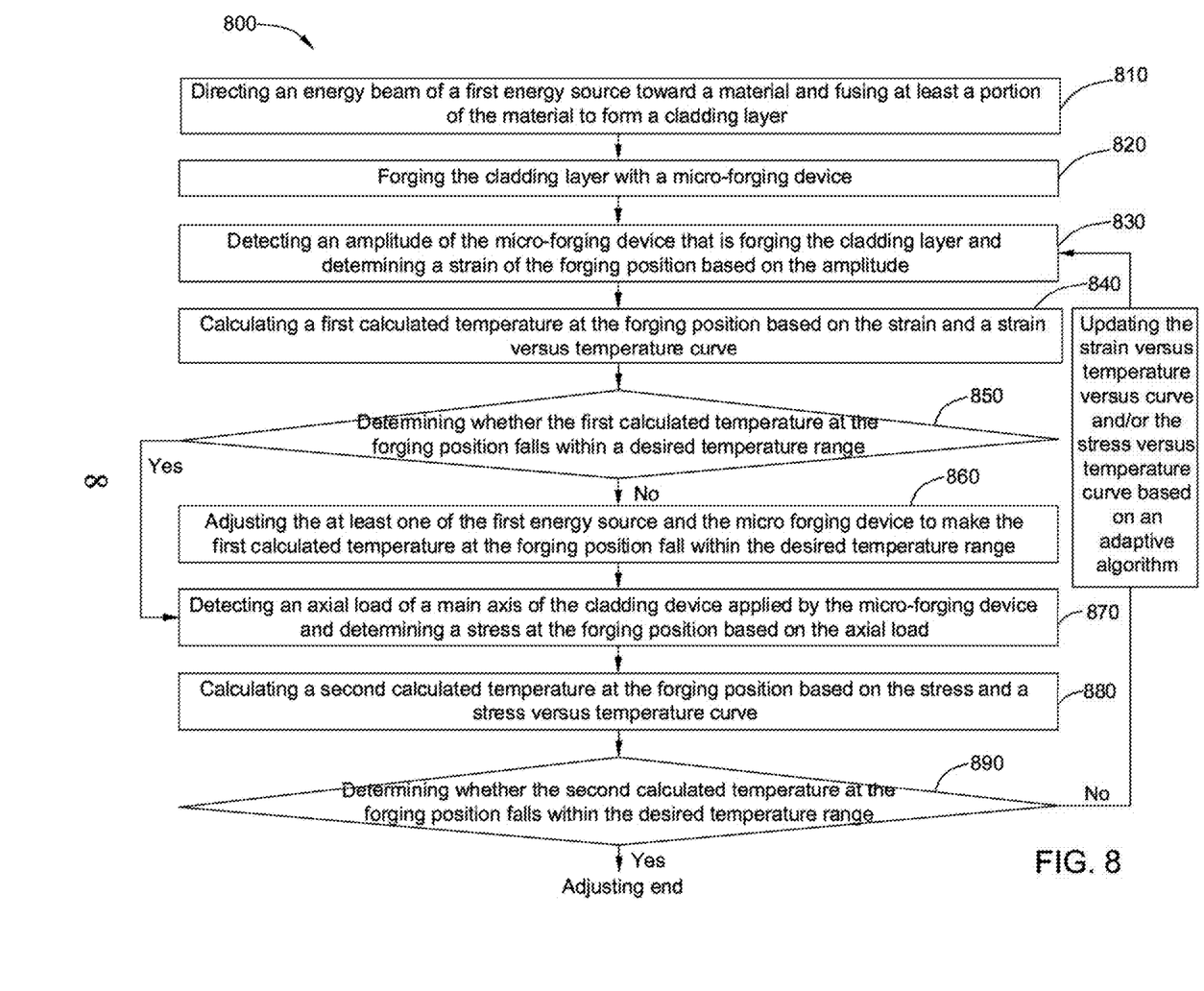
FIG. 8 is a schematic flow chart of a temperature control method for additive manufacturing according to another embodiment of the present invention.

FIG. 8 is a flow chart of a temperature control method 800 for additive manufacturing according to an embodiment of the present invention. The method 800 comprises the following steps:

Step 810: Directing an energy beam of a first energy source toward a material and fusing at least a portion of the material to form a cladding layer.

Step 820: Forging the cladding layer with a micro-forging device.

Step 830: Detecting the amplitude of the micro-forging device when forging the cladding layer, and determining the strain of the cladding layer at the forging position based on the amplitude.

Step 840: Calculating a first calculated temperature of the cladding layer at the forging position based on the strain and the stored strain versus temperature curve.

Step 850: Determining whether the first calculated temperature falls within a desired temperature range required for material forging, and if it is the case, perform Steps 870-890, otherwise, perform Steps 860-890.

Step 860: Making the first calculated temperature at the forging position fall within the desired temperature range by adjusting at least one of the first energy source and the micro-forging device.

Step 870: Detecting the axial load of the main axis of the cladding device applied by the micro-forging device, and determining the stress of the cladding layer at the forging position based on the axial load.

Step 880: Calculating a second calculated temperature at the forging position based on the stress and the stored stress versus temperature curve.

Step 890: Determining whether the second calculated temperature falls within a desired temperature range, if it is the case, then terminate adjusting, otherwise, updating the strain versus temperature curve and/or the stress versus temperature curve based on the adaptive algorithm, and returning to Step 830.

By performing real-time precise temperature control of the real-time micro-forging device indirectly through detecting the strain and/or stress of the cladding layer at the forging position, this is able to solve the issue of controllability of the additive manufacturing process during melt-bonded forging to a certain extent, thereby realizing the objective of rapidly manufacturing delicate and customized products with complex structures.

While the present invention has been described with reference to specific embodiments thereof, it will be understood by those skilled in the art that many modifications and variations can be made thereto. It is, therefore, to be understood that the appended claims are intended to cover all such modifications and variations insofar as they are within the true spirit and scope of the invention.

What we claim is:

1. A temperature control system for additive manufacturing, the system comprising:
   a cladding device configured to fuse a material and form a cladding layer, the cladding device comprising a first energy source configured to direct an energy beam toward the material for fusing at least a portion of the material to form the cladding layer;
   a micro-forging device coupled to the cladding device for forging the cladding layer;
   a detecting device configured to detect a first internal effect parameter of the cladding layer at a forging position where the cladding layer is forged by the micro-forging device, wherein the first internal effect parameter includes at least one of a stress or a strain of the cladding layer;
   a control module configured to receive the first internal effect parameter detected by the detecting device, and calculate a first calculated temperature at the forging position based on the first internal effect parameter; and
   an adjusting module coupled to at least one of the first energy source and the micro-forging device and configured to receive the first calculated temperature and to adjust the at least one of the first energy source and the micro-forging device to make the first calculated temperature at the forging position fall within a desired temperature range if the first calculated temperature does not fall within the desired temperature range.

2. The temperature control system according to claim 1, wherein the control module comprises a storage unit stored therein a first internal-effect-parameter versus temperature curve of the material, and the control module is configured to calculate the first calculated temperature at the forging position based on the first internal effect parameter and the first internal-effect-parameter versus temperature curve.

3. The temperature control system according to claim 2, wherein the detecting device is configured to detect a second internal effect parameter of the cladding layer at the forging position, wherein the control module is configured to calculate a second calculated temperature at the forging position based on the second internal effect parameter and a second internal-effect-parameter versus temperature curve stored by the storage unit, if the first calculated temperature at the forging position falls within the desired temperature range and to update the first internal-effect-parameter versus temperature curve and/or the second internal-effect-parameter versus temperature curve based on an adaptive algorithm, if the second calculated temperature does not fall in the desired temperature range.

4. The temperature control system according to claim 1, wherein the cladding device is coupled to the micro-forging device to move in synchronization.

5. The temperature control system according to claim 1, wherein the micro-forging device comprises a forging hammer configured to forge the cladding layer through vibration, and the detecting device comprises a distance sensor configured to detect an amplitude of the micro-forging device that is forging the cladding layer and determine the strain of the cladding layer at the forging position based on the amplitude.

6. The temperature control system according to claim 5, wherein the control module comprises a storage unit stored therein a strain versus temperature curve of the material, and the control module is configured to calculate the first calculated temperature at the forging position based on the strain and the strain versus temperature curve.

7. The temperature control system according to claim 6, wherein the detecting device is configured to detect the stress of the cladding layer at the forging position, wherein, the control module is configured to calculate a second calculated temperature at the forging position based on the stress and a stress versus temperature curve stored by the storage unit, if the first calculated temperature at the forging position falls within the desired temperature range and to update the strain versus temperature curve and/or the stress versus temperature curve based on an adaptive algorithm, if the second calculated temperature does not fall in the desired temperature range.

8. The temperature control system according to claim 1, wherein the detecting device comprises a stress detecting module configured to detect an axial load of a main axis of the cladding device applied by the micro-forging device and determine the stress of the cladding layer at the forging position based on the axial load.

9. The temperature control system according to claim 8, wherein the control module comprises a storage unit stored therein a stress versus temperature curve of the material, and the control module is configured to calculate the first calculated temperature at the forging position based on the stress and the stress versus temperature curve.

10. The temperature control system according to claim 1, wherein, the adjusting module is configured to increase an energy output of the first energy source if the first calculated temperature at the forging position is lower than a minimum value of the desired temperature range.

11. The temperature control system according to claim 1, further comprising a second energy source selected from a laser energy source, an electron beam energy source, a plasma energy source, an infrared energy source, an electromagnetic induction energy source and a resistance energy source, wherein, the adjusting module is configured to increase an energy output of the second energy source if the first calculated temperature at the forging position is lower than a minimum value of the desired temperature range.

12. The temperature control system according to claim 1, wherein, the adjusting module is configured to decrease an energy output of the first energy source when the first calculated temperature at the forging position is larger than a maximum value of the desired temperature range.

13. The temperature control system according to claim 1, wherein the micro-forging device is movable relative to the cladding device to adjust a distance between the micro-forging device and a molten pool which the material is fused; and the adjusting module is configured to move the micro-forging device to an adjusted forging position directionally away from the molten pool until the first calculated temperature at the adjusted forging position falls within the desired temperature range if the first calculated temperature at the forging position is larger than a maximum value of the desired temperature range.

* * * * *